United States Patent
Frommann et al.

(10) Patent No.: US 12,258,940 B2
(45) Date of Patent: Mar. 25, 2025

(54) METHOD FOR CONTROLLING THE ROTOR SPEED OF A WIND TURBINE

(71) Applicant: Wobben Properties GmbH, Aurich (DE)

(72) Inventors: Johannes Frommann, Hamburg (DE); Enno von Aswege, Großefehn (DE); Ulf Schaper, Staffhorst (DE); Gnanasekaran Rengaraj, Tamil Nadu (IN)

(73) Assignee: Wobben Properties GmbH, Aurich (DE)

( * ) Notice: Subject to any disclaimer, the term of this patent is extended or adjusted under 35 U.S.C. 154(b) by 246 days.

(21) Appl. No.: 17/835,615

(22) Filed: Jun. 8, 2022

(65) Prior Publication Data
US 2022/0397092 A1 Dec. 15, 2022

(30) Foreign Application Priority Data

Jun. 11, 2021 (EP) ..................................... 21179056

(51) Int. Cl.
*F03D 7/02* (2006.01)
(52) U.S. Cl.
CPC ......... *F03D 7/0276* (2013.01); *F03D 7/0224* (2013.01); *F03D 7/0284* (2013.01);
(Continued)
(58) Field of Classification Search
CPC .... F03D 7/0224; F03D 7/0276; F03D 7/0284; F05B 2270/32; F05B 2270/327; F05B 2270/328; F05B 2270/335
See application file for complete search history.

(56) References Cited

U.S. PATENT DOCUMENTS

| 4,420,692 A * | 12/1983 | Kos | F03D 7/0292 416/41 |
| 4,435,647 A * | 3/1984 | Harner | F03D 7/043 416/41 |

(Continued)

FOREIGN PATENT DOCUMENTS

| CN | 109973299 B | 3/2020 |
| EP | 2840703 A2 | 2/2015 |
| EP | 3779183 A1 | 2/2021 |

*Primary Examiner* — Tulsidas C Patel
*Assistant Examiner* — Thomas K Quigley
(74) *Attorney, Agent, or Firm* — Seed IP Law Group LLP

(57) ABSTRACT

Method for controlling a rotor speed of a rotor of a wind turbine at rated or curtailed operation conditions the rotor being an aerodynamic rotor having one or a plurality of rotor blades, and the wind turbine further having a tower and a generator wherein a pitch control provides a pitch angle set value depending on an actual rotor speed for setting a pitch angle of the rotor blades, a main control provides a main power or torque set value for controlling the power or torque of the generator, and an additional control provides an additional power or torque set value depending on the actual rotor speed, wherein the additional power or torque set value is provided as an offset value and is added to the main power or torque set value respectively, wherein the additional power or torque set value is calculated depending on a control deviation of the rotor speed, and optionally, in combination with the additional control, or instead of it, a maximum power control provides a maximum power value as a varying value for limiting an output power of the generator and the maximum power value is calculated depending on a predetermined power limit value, and depending on a predetermined reference duration, in order to provide for the reference duration an average power reaching or at least not exceeding the predetermined power limit value.

17 Claims, 5 Drawing Sheets

(52) U.S. Cl.
CPC ..... *F05B 2270/32* (2013.01); *F05B 2270/327* (2013.01); *F05B 2270/328* (2013.01); *F05B 2270/335* (2013.01)

(56) References Cited

U.S. PATENT DOCUMENTS

| | | | | |
|---|---|---|---|---|
| 4,656,362 | A * | 4/1987 | Harner | F03D 7/0224 416/41 |
| 4,695,736 | A * | 9/1987 | Doman | F03D 15/10 290/55 |
| 6,420,795 | B1 | 7/2002 | Mikhail | H02P 9/007 290/55 |
| 10,480,488 | B2 * | 11/2019 | Drossel | F03D 7/0224 |
| 10,890,159 | B2 * | 1/2021 | Caponetti | F03D 7/043 |
| 11,879,432 | B2 * | 1/2024 | Von Aswege | F03D 7/047 |
| 2006/0273595 | A1 | 12/2006 | Avagliano | H02J 3/381 290/44 |
| 2008/0030027 | A1 * | 2/2008 | Erdman | F03D 7/0224 290/40 R |
| 2010/0286835 | A1 * | 11/2010 | Nyborg | F03D 7/048 290/44 |
| 2011/0305568 | A1 * | 12/2011 | Brath | F03D 7/046 416/1 |
| 2013/0106108 | A1 * | 5/2013 | De Boer | F03D 7/045 290/44 |
| 2013/0257051 | A1 * | 10/2013 | Spruce | F03D 7/028 290/44 |
| 2014/0203563 | A1 * | 7/2014 | Bowyer | F03D 7/0268 290/44 |
| 2015/0267686 | A1 * | 9/2015 | Kjaer | F03D 9/255 290/44 |
| 2017/0022972 | A1 * | 1/2017 | Kjær | F03D 7/0224 |
| 2018/0017042 | A1 * | 1/2018 | Baun | H02K 7/1838 |
| 2018/0171977 | A1 * | 6/2018 | Kjær | F03D 7/0276 |
| 2018/0187648 | A1 * | 7/2018 | Spruce | F03D 7/0292 |
| 2019/0024634 | A1 * | 1/2019 | Tarnowski | F03D 7/0284 |
| 2019/0040843 | A1 * | 2/2019 | Gray | F03D 7/048 |
| 2019/0055924 | A1 * | 2/2019 | Kjær | F03D 7/048 |
| 2019/0072072 | A1 * | 3/2019 | Fang | F03D 7/044 |
| 2019/0128242 | A1 * | 5/2019 | Grunnet | F03D 7/0224 |
| 2019/0170119 | A1 * | 6/2019 | Nielsen | G05B 19/042 |
| 2020/0158084 | A1 * | 5/2020 | Caponetti | F03D 9/25 |
| 2020/0248674 | A1 * | 8/2020 | Hawkins | F03D 7/044 |
| 2020/0263666 | A1 * | 8/2020 | Pedersen | F03D 7/0224 |
| 2020/0318610 | A1 * | 10/2020 | Drossel | F03D 9/255 |
| 2020/0378357 | A1 * | 12/2020 | Louazel | F03D 9/25 |
| 2021/0115898 | A1 * | 4/2021 | Messing | F03D 9/25 |
| 2021/0156357 | A1 * | 5/2021 | Caponetti | F03D 7/043 |
| 2021/0164441 | A1 * | 6/2021 | Caponetti | F03D 7/0224 |
| 2021/0172419 | A1 * | 6/2021 | Neto | F03D 9/11 |
| 2021/0207584 | A1 * | 7/2021 | Hammerum | F03D 7/0224 |
| 2021/0231102 | A1 * | 7/2021 | Thomsen | F03D 7/0296 |
| 2022/0010772 | A1 * | 1/2022 | Von Aswege | F03D 7/0276 |
| 2022/0228556 | A1 * | 7/2022 | Vasudevan | F03D 7/028 |

* cited by examiner

METHOD FOR CONTROLLING THE ROTOR SPEED OF A WIND TURBINE

BACKGROUND

Technical Field

The present invention is directed to a method for controlling a rotor speed of an aerodynamic rotor of a wind turbine and to a wind turbine which is controlled by such method.

Description of the Related Art

Common wind turbines use an aerodynamic rotor having a substantially horizontal access of rotation and a plurality of rotor blades, usually three rotor blades. Each rotor blade has an adjustable pitch angle for adjusting an angle of attack between the rotor blade and the wind moving the rotor blade. Each pitch angle may be adjusted individually, but often all rotor blades are controlled uniformly using the same pitch angle for all rotor blades. Accordingly if a control of a wind turbine only considers one pitch angle, all rotor blades are controlled to the same pitch angle. The pitch angle can also be depicted as blade angle.

In a sub rated operation mode the wind is not strong enough for the wind turbine to produce rated power. In such case the pitch angle of all rotor blades may be set to a constant value which is considered to be the optimum value. Depending on the wind speed the wind turbine will operate with a varying rotor speed. A particular operating point may be characterized by a value of the generated power and a value of the rotor speed. Such operating point may be selected depending on a rotor speed versus a power characteristic curve. However instead of the generated power a generator torque may be considered according to a slightly different concept.

At and above rated wind speed the wind turbine needs to be controlled to limit the rotor speed and the output power or the generator torque respectively in order to avoid damages of the wind turbine. A general concept is to pitch the rotor blades out of the wind was increasing wind speed such that even with increasing wind speed the output power and rotor speed is kept fairly constant. In particular the wind turbine is controlled such that the wind turbine is operated with rated rotor speed and rated output power. Rated rotor speed and rated output power may also be referred to as nominal rotor speed or nominal output power respectively.

For long-term changes of the wind speed the pitch angle is adjusted to match the new wind speed such that the aerodynamic rotor is basically only extracting rated power. However in short-term variations of the wind speed, in particular in case of wind gusts, the output power can be kept constant by adjusting the generator torque based on the relationship between power P, generator torque M and rotor speed ω according to the formula $P=M*\omega$.

Accordingly, such wind gusts result in a change of the rotor speed ω and the generator torque M is adjusted accordingly such that the output power P is kept constant. The rotor speed can also be depicted by the symbol "n".

Accordingly, a decrease in wind speed will result in a decrease of the rotor speed ω and that will result in an increase of the generator torque M. Such small variations in the rotor speed are acceptable as only short variations are expected. Therefore only short variations shall be compensated by such control of the generator torque M. However said increase of generator torque even further reduces the rotor speed and accordingly such (negative) wind gust may result in a significant decrease of the rotor speed. Of course, in case of a positive wind gust an increase of the rotor speed may result.

Such decrease or increase of the rotor speed is thus an acceleration of the aerodynamic rotor and such acceleration, be it positive or negative, of the aerodynamic rotor may result in an oscillating force of the nacelle and thus of the tower head in a direction perpendicular to the wind speed and thus perpendicular to the access of rotation. The force on the aerodynamic rotor in longitudinal direction, i.e., in the direction of the access of rotation is also varying and thus causing an oscillating load on the nacelle and thus on the tower head. Accordingly such control may result in an increased load at the tower head in two directions. As a further result the overall load on the tower may be increased.

BRIEF SUMMARY

One or more embodiments are directed to improved control to reduce loads on the tower of the wind turbine. At least in alternative solution shall be provided with respect to known solutions.

Provided is a method for controlling a rotor speed of a rotor of a wind turbine is suggested at rated or curtailed operation conditions. At rated conditions the wind speed is at or above rated wind speed. However it may for a short-term also drop below rated wind speed. Under such conditions there is usually more wind power available than the rated power of the wind turbine. Therefore the output power of the wind turbine needs to be limited, as well as the rotor speed.

However, a similar situation may also occur when the wind turbine is operating in curtailed operation conditions, i.e., when the wind turbine has to limit the output power on a value below rated power. Such condition may also occur at wind speeds below rated wind speed.

The rotor of the wind turbine is thus an aerodynamic rotor having one or a plurality of rotor blades and the wind turbine has a tower and a generator. Accordingly such wind turbine is underlying the suggested method for controlling.

A pitch control provides a pitch angle set value depending on an actual rotor speed for setting a pitch angle of the rotor blades. In particular the pitch controller receives the rotor speed as an input value and provides a pitch angle set value based on this input value. This pitch angle set value may in particular be the value of a common pitch angle, common for all rotor blades. The pitch angle set value may also be or comprise a derivation of the pitch angle set value, i.e., a derivation with respect to time. This way the pitch control can better control the adjusting of the pitch angle. The pitch angle set value may thus also be a pitch rate.

A main control provides a main power or torque set value for controlling the power or torque of the generator and an additional control provides an additional power or torque set value depending on the actual rotor speed, wherein the additional power or torque set value is provided as an offset value and is added to the main power or torque set value respectively.

As the power P and the toque M of a generator are interrelated depending on the rotor speed ω according to the formula $P=M*\omega$, there are two strategies possible according to which the control can be based on the power or it can be based on the torque. Accordingly, both strategies are suggested in parallel and are similar in many aspects. The preferred strategy is to use the power and accordingly the below description focusses on the power. However the torque, i.e., the generator torque, can be used as well in a similar manner.

Thus the main control may provide a main power set value and the additional control may than provide an additional power set value. The additional power set value is provided and thus calculated depending on the actual rotor speed. The actual rotor speed may be measured by using a speed sensor or it may be determent otherwise.

The main power set value sets the general level of power to be produced. In addition for considering dynamic effects as explained below the additional power set value is provided and calculated depending on the actual rotor speed and added to the main power set value. Accordingly a total power set value results which is used as a total set value for controlling the wind turbine. In particular the main power set value is at least 80% of the total power set value.

The main power set value will consider the power level that shall be produced. In particular the main power set value may be the rated power or the curtailed power if the wind turbine is operated in a curtailed operation mode.

In case when the torque is used at the main control value the main torque set value and the additional torque set value may form a total torque set value. The main torque set value may be at least 80% of the total torque set value. The main torque set value may be a nominal torque or in case of a curtailed operation mode a corresponding curtailed torque value.

It is further suggested that the additional power or torque set value is calculated depending on a control deviation of the rotor speed. In other words, the additional power or torque set value is calculated depending on the control deviation of the rotor speed. Accordingly the additional power set value or the additional torque set value are calculated based on a difference between the actual rotor speed and the rotor speed set value. This way the dynamic behavior of the rotor speed can be considered and this is done by providing the additional power set value or the additional torque set value.

An optional aspect is suggested which can be applied instead of the additional control or in addition to it. For that a maximum power controller provides a maximum power value as a varying value for limiting an output power of the generator and the maximum power value is calculated depending on a predetermined power limit value and depending on a predetermined reference duration. This is suggested in order to provide for the reference duration an average power reaching or at least not exceeding the predetermined limit value.

Within said predetermined reference duration the maximum power value is adjusted such, that it may exceed the predetermined limit value as long as the average power for such reference duration does not exceed the predetermined limit value. The reference duration thus defines the length for which the average power is calculated.

For this aspect the idea is underlying that the predetermined power limit value may be exceeded for a time period shorter than the predetermined reference duration. The predetermined power limit value shall generally not be exceeded, but if it is exceeded for such short time, that is acceptable if the predetermined power limit value is undercut for a further time period within set predetermined reference duration. Exceeding and undercutting the predetermined power limit value shall however be coordinated such that the average power does not exceed the predetermined power limit. The optimum would be that the average power reaches the predetermined power limit value exactly.

This way a too strict reduction of power is avoided. It was found that such strict power reduction would result if the turbine is controlled such that the predetermined power limit value may never be exceeded. In that case there will always be time periods when the power will be below the predetermined power limit value, but it will never be above. The result will be that the average power will always be significantly below the predetermined power limit value.

Accordingly, two alternatives are provided, which may also be combined. The one alternative is to set an additional power set value or an additional torque set value based on the control deviations in the rotor speed. Taking the strategy of controlling the power it is thus suggested, not to try to keep the power constant even with varying rotor speed.

It was also found that controlling the power to a constant value at decreasing rotor speed would result in an increasing generator torque and thus a further decrease in the rotor speed. This can be avoided by changing the power set value depending on such control deviations of the rotor speed. In other words in case the rotor speed decreases the additional power set value will be negative and thus the total power value will decrease. This avoids said increase of the generator torque. This way a corresponding load due to large control deviations in the rotor speed can be avoided. Accordingly, the same energy production by reduced load is possible or a higher energy production by the same loads.

In case the torque, i.e., the generator torque, is used as the control value, the situation is similar. Even though according to such concept the generator torque is used for controlling the wind turbine, the output power will finally be controlled. The reason is that there are limits for feeding electrical power into the electrical grid. Even if the control concept uses the generator torque, there is still a power limit which the wind turbine has to meet. Based on this power limit a corresponding torque is calculated which is basically the main torque set value. If the rotor speed decreases, the output power shall nevertheless be constant to known concepts. In order to keep the output power constant, a corresponding new main torque set value is calculated. This concept can be maintained and can be implemented in the main control.

In case of this concept using the generator torque it is now suggested to use a control deviation in the rotor speed to calculate an additional torque set value. Accordingly, the known concept for the main torque set value is maintained and improved by the additional control. This way an additional torque set value is calculated based on the control deviation of the rotor speed and will thus correct or at least amend the main torque set value.

The result is basically the same as when using the power as a control value, namely that the power is not kept constant anymore but that simply speaking, the generator torque is kept constant. Of course, the generator does not necessarily need to be kept constant but it is at least suggested to lower the change of the generator torque compared to the process which is still implemented in the main control.

When using the generator torque as the control value, it seems to be possible to directly provide a constant torque value. However, it is suggested, to keep the known control concept, which is implemented in the main control and to take care for the explained concept of keeping the generator torque constant or to have smaller changes in the generator torque by applying this additional control. This way existing control concepts do not need to be changed completely. It is also possible to improve existing systems by just implementing the additional control.

The second aspect of controlling the output power to an average value, which is not exceeding the predetermined maximum power limit, rather than always making sure that the output power is below the predetermined maximum power limit, increases the energy production. But it can also be used for a load reduction by not decreasing the energy production.

Accordingly both aspect can be used to reduce loads of the wind turbine, in particular loads on the tower head, without reducing the energy production. It can also be used to increase the energy production without increasing back system loads of the wind turbine.

According to one aspect the additional power or torque set value is calculated depending on a control deviation of the rotor speed using a nonlinear and/or a time variant control algorithm.

The control deviation is the difference of a rotor speed set value and the actual rotor speed. The actual rotor speed may be measured or determined otherwise. Accordingly, the actual rotor speed and the rotor speed set value are input values of the additional control. A maximum power value which may also vary, may also be an input value of the additional control.

One possibility to consider these input variables is to provide a multiplication, making the control a nonlinear control. One input variable may be considered as a time variant gain making it a time variant control. Further details of aspects of the additional control are explained below.

According to one aspect the main control provides the power or torque set value depending on the rotor speed. The main control may provide a constant value for the power or torque set value but it was found that the control can be improved if the main power or torque set value is also depending on the rotor speed. This way particular operating conditions in which the general power output may be adapted depending on the rotor speed can also be provided making the control more flexible. This may also lead to reducing loads of the wind turbine or to increasing energy production without increasing loads.

According to one aspect the main control provides power or torque set values depending on the rotor speed in a table, or otherwise. If the rotor speed is below rated speed, in particular below a lower rotor speed limit value being below rated rotor speed, in particular being 0.5 to 1 rpm below rated rotor speed, the set values of power or generator torque are below rated values (rated power or rated generator torques) as well. If however the rotor speed is at or above rated speed, at least at or above the lower rotor speed value, the set values of power or generator torque are at or above rated values (rated power or rated generator torques). For these rotor speeds one possibility is to let these values raise far above rated values in order to shift part of the control to at least one limiting function.

According to one aspect the additional power or torque set value is calculated to counteract generator torque fluctuations caused by fluctuations of the rotor speed due to fluctuations in the wind speed. Fluctuations in the wind speed have an impact on the operation of the wind turbine and the movement of the rotor. One Impact is on the generator torque resulting in fluctuations of the generator torque. An underlying control principle which focusses on keeping the power constant may increase the resulting fluctuations of the generator torque. The additional power or torque set value is thus calculated such that the additional power or torque will counteract such fluctuations of the generator torque values, i.e., the additional power or torque value will reduce such resulting fluctuations.

In particular the main control is designed to keep the power constant or fluctuations of the power low in case of fluctuating rotor speed, resulting in control related fluctuations of the generator torque. In view of that the additional power or torque set value is calculated to counteract such control related fluctuations of the generator torque. Accordingly, it is realized that the main control may result in torque fluctuations whereas the additional control counteracts such control related fluctuations of the generator torque. Thus the additional control is adapted to the main control and anticipates the behavior of the wind turbine which would result from the main control without incorporating the additional control.

To realize this concept it was found that a successful strategy is to adapt the main power or torque set value by adding the additional power or torque set value. This way the behavior of the control of the wind turbine may be adapted without amending the main control.

According to one aspect the additional power or torque set value is calculated such that a longitudinal tower load in the direction of an axis of rotation of the generator, in particular a longitudinal oscillation, is reduced by applying the additional power or torque set value. In case of a positive wind gust a load on the rotor and thus the tower head will rise. This makes the tower band backwards in the longitudinal direction and the rotor speed will increase. A control aiming to keep the power constant would lead to a reduction of the generator torque reducing the force acting from the wind on the rotor. As a result, the tower head will swing forward. Accordingly, there is a longitudinal power oscillation and thus a longitudinal load.

To reduce that the additional control provides the additional power or torque set value such, that the described swinging forward of the tower head is reduced. If the additional power or torque set value results in keeping the generator torque constant said swinging forward of the tower head is reduced. However, it may also be advantages to even increase the generator torque and thereby further reducing said swinging forward of the tower head. Accordingly in such case an overcompensation of the main control reducing the generator torque may be suggested. This can be done by using a corresponding gain factor, to give one example.

The principle applies also analogously in case of a negative wind gust, i.e., when the wind speed is suddenly dropping.

Optionally the additional power or torque set value is calculated such that a lateral tower load perpendicular to the access of rotation of the generator, in particular a lateral tower oscillation, is reduced by applying the additional power or torque set value. In case of a positive wind gust, the rotor speed will increase and the main control may result in a decrease of the generator torque. A further result may be a further increased rotor speed further resulting in pitching of the rotor blades in order to avoid an even further increase of the rotor speed. Such pitching of the rotor blades and a corresponding reduction of the rotor speed may result in a lateral swing of the nacelle and thus of the head of the tower.

The suggested additional power or torque set value counteracts the described decrease of the generator torque and thus also reduces or limits any further increase of the rotor speed. This may avoid pitching of the rotor blades and thus avoids or reduces said lateral oscillation and accordingly said lateral load on the tower.

However, if the additional power or torque set value is calculated with a high amount such that the reduction of the generator torque is overcompensated, the rotor speed may even decrease. This may result in pitching of the rotor blades in the other direction also possibly causing lateral oscillations. Accordingly, it is suggested to calculate the additional power or torque set value such that both kinds of pitching, resulting in said lateral oscillation of the tower head and accordingly said lateral load on the tower shall be avoided. In order to calculate such desired additional power or torque set value a corresponding gain factor may be set. Such gain factor may be set to 100% in the meaning that 100% corresponds to controlling a constant generator torque. Accordingly in that case the explained torque fluctuation is neither overcompensated nor undercompensated.

Of course, said example also applies analogously for negative wind gusts.

According to one aspect the additional power or torque set value is calculated depending on the maximum power value and/or depending on the rotor speed set value. The maximum power value may be related to the physical characteristic of the generator. However, it may also be much lower in case of a curtailed operation. The maximum power value may also vary, at least in a limited amount such as 10% or 20% of a rated power value of the generator.

As the additional power or torque set value is supposed to counteract control related fluctuations of the generator torque, it was found to be advantages to calculate the additional power or torque set value depending on the actual maximum power value. In other words, if the actual maximum power value is smaller than the rated power value of the generator, the control related fluctuations of the generator torque may also be smaller and accordingly the additional power or torque set value which shall counteract such fluctuations of the generator torque shall also be smaller.

However, it was also found that according to one aspect the maximum power value may vary and such variation can also be considered in calculating the additional power or torque set value. This way dynamical aspects can be incorporated as well.

The rotor speed set value is included in the control deviation of the rotor speed. However, on top of using the control deviation of the rotor speed it is suggested to also and explicitly consider the rotor speed set value. Also depending on the rotor speed set value, a gain factor may be calculated to set the amount of the additional power or torque set value. Accordingly, this additional power or torque set value is not just calculated depending on the control deviation on the rotor speed, but the result may also be multiplied by a value depending on such gain factor which may be depending on the rotor speed set value.

According to one aspect the additional power or torque set value is calculated by multiplying a signal representative of the control deviation of the rotor speed and a variable gain signal. Such signal being representative of the control deviation of the rotor speed may in the simplest case be identical to this control deviation, i.e., the signal representative of the control deviation of the rotor speed is the difference between the rotor speed set value and the actual rotor speed. This way fluctuations of the rotor speed are considered and reflected in the additional power or torque signal.

In addition the variably gain signal may introduce further aspects by multiplying it with the signal representative of the control deviation of the rotor speed.

In addition, the variable gain signal may change the amplitude of this signal representative of the control deviation in a dynamic way. In particular the variable gain signal may be a signal representative of a scaled reference torque. This way the operating point with respect to the generator torque may directly influence the additional power or torque signal.

In addition or alternatively the variable gain signal is calculated depending on the maximum power value, the rotor speed set value and a gain factor and/or a gain limiter and/or a gain change limiter. By calculating the variable gain signal depending on the maximum power value and the rotor speed set value, a signal representative of a scaled reference torque may result.

Accordingly, it is suggested to calculate the variable gain signal at least depending on the maximum power value and depending on the rotor speed set value. Further adjustments shall be applied, i.e., a gain factor, a gain limiter and/or a gain change rate limiter. At least one of these three shall be used but also two of them or all three may be used.

It was found that the maximum power value in relation to the rotor speed set value can be used to adequately adjust the amplitude of the signal representative of the control deviation of the rotor speed. Such relation can be calculated by dividing the maximum power value by the rotor speed set value. Accordingly, the higher the maximum power value, the higher shall also be the additional power or torque set value. The lower the rotor speed, the higher the additional power or torque set value.

In this respect it was found that the rotor speed set value is adequate to consider the rotor speed. In other words, it is not necessary to consider the actual rotor speed but that considering the rotor speed set value is enough. This way fluctuations for calculating this variable gain factor, in particular quick dynamic changes, may not lead to dynamic problems in the control, as the rotor speed set value can be a constant value. It is also important regarding the fact, that a division by said rotor speed is suggested, making variations of such variable problematic if it may change in an unpredictable way.

Using the gain factor, the physical unit of the power divided by rotor speed, which is in fact the physical unit of a torque, can be changed. It was also found that exceeding any unwanted and may be unphysical limits in the control can be avoided by applying a gain limiter. It was also found that too quick changes in this variable gain signal can be problematic as these would also result in quick changes in additional power or torque set value. Accordingly, to avoid this it was found that the easiest way is to implement a gain change limiter for the variable gain signal. By multiplying it with the signal representative of the control deviation of the rotor speed this limit will also apply to the resulting additional power or torque set value. However, a separate limiter may also be provided for the control deviation of the rotor speed.

According to one aspect the variable gain signal is calculated by calculating a reference torque value by dividing the maximum power value by the rotor speed set value and by multiplying the reference torque value with the gain factor. The gain factor may be 100%, but preferably the gain factor is not 1 or 100% but smaller or bigger. Optionally the gain signal is limited by the gain limiter and/or a change rate of the gain signal is limited by the gain change rate limiter.

Therefore the reference torque calculated by dividing the maximum power value by the rotor speed set value forms a scaled reference torque value. At least it can be understood as being scaled with respect to the rotor speed set value. By multiplying this reference torque value with the gain factor, the amplitude of the resulting variable gain signal and thus the amplitude of the power or torque set value can be adjusted. If the gain factor is 1 or 100%, the additional control will result in controlling the generator torque to a constant value. By choosing the gain factor to be larger than 1 will result in an increase of the generator torque in case of increasing rotor speed. Such value may be chosen to further reduce longitudinal oscillations.

Optionally the gain signal is limited by the gain limiter and/or a change rate of the gain signal is limited by the gain change rate limiter. The limitation, be it for absolute values and/or for slopes, can be realized by limiting the gain signal.

However optionally a rate limiter may be provided in addition or instead for limiting the signal representative of the control deviation of the rotor speed. In addition or instead there may be a limiter for limiting the additional power or torque set value.

It is particularly suggested to multiply a control deviation of the rotor speed by the variable gain signal in order to calculate an additional power set value. In order to calculate an additional torque set value, it is suggested to use a relative control deviation of the rotor speed, in particular a control deviation of the rotor speed divided by the rotor speed set value, and multiply this relative control deviation of the rotor speed with the variable gain signal.

Preferably the variable gain signal is a signal representative of a scaled reference torque. In particular the variable gain signal is a scaled reference torque or at least a signal proportional to a scaled reference torque, possibly additionally limited in its amplitude or change rate. If this signal is multiplied with the control deviation of the rotor speed a power value will result and may form, possible after further limitation, the additional power set value. If such scaled reference torque or similar signal is multiplied with a relative control deviation of the rotor speed, an additional torque set value will result.

According to one aspect the gain factor is set in a range of 10% to 200%, preferably in a range of 105% to 200%, in particular in a range of 110% to 150%. A gain factor of 0% would result in deactivating the additional control. Any value above 0%, i.e., already 10% will result in counteracting control related fluctuations of the generator torque. A value of 100% would lead to a constant torque. Such constant torque is optimal for minimizing lateral oscillations of the tower and thus lateral loads of the tower. A value of 200% would double such counteracting and therefore it is not suggested to go above 200%. Such high value could at least result in opposite lateral load or oscillations with respect to the case when no counteracting would be performed.

A value above 100% is preferred as that reduces longitudinal oscillations and loads. In this respect a lower value of 105% is suggested in order to reduce such longitudinal oscillations without significantly increasing lateral oscillations. The value may go up to 200% in order to even further reduce longitudinal oscillations. Such high values are only to be suggested if a resulting increase of lateral oscillations is acceptable. Based on this understanding it was found that a value of at least 110% to at most 150% is a good compromise for reducing longitudinal oscillations without having a too much increase of lateral oscillations.

In addition or alternatively the gain factor is, at least temporary, set to a value above 100% in order to increase the generator torque with increasing rotor speed. This is, as explained above, particularly advantageous for reducing longitudinal oscillations. By setting the gain factor only temporary to such high value may result in not too much increasing the lateral oscillations.

In addition or alternatively, the gain factor is calculated depending on an overload capability of the generator describing the capability of the generator to exceed a rated power value and/or a rated generator torque value. In particular when operating the wind turbine with rated power, i.e., not in a curtailed operation, the power and as well the generator torque are at their limits, defined by these rated values. The suggested additional control leads with increasing rotor speed to an increase of the power and thus the power exceeds rated power. Depending on the gain factor, i.e., if it is above 100%, the generator torque also increases with increasing rotor speed.

However, it was found that exceeding rated values may be acceptable in some circumstances. In particular exceeding with small values for a short term may be acceptable. These particular circumstances, i.e., how long and how much rated values may be exceeded, is defined by said overload capability. This can be defined by limit values. The gain factor influences how much and how long the rated values will be exceed, and therefore it is suggested to set the gain factor depending on the overload capability.

Accordingly, the gain factor can be calculated such that the power value will still be below a power limit value and that the generator torque will still be below a torque limit value. Such overload capability can thus be met by selecting a corresponding gain factor. The value of the gain factor in order to comply with the overload capability can be evaluated in tests or simulations. Such tests or simulations may consider typical or maximum gusts.

According to one aspect the maximum power controller operates such, that in a repeating manner for each current time the average power is calculated for a time period having a length of the predetermined reference duration and ending at the current time, and the maximum power value is calculated depending on the calculated average power and a previously calculated maximum power value. Accordingly at the actual time an average power is calculated for the last time interval of the reference duration, e.g., for the last 10 minutes if the predetermined reference duration is 10 minutes. If that average power is below the predetermined power limit the maximum power is set to a high value in order to raise the average power.

This calculation of the average power and calculation of the maximum power value is repeated steadily. Accordingly the actual calculation can consider results of the previous calculation, i.e., the previously calculated maximum power value. And that may be done to avoid any stepwise changes of the calculated maximum power value or too high change rates in the calculated maximum power value. In particular the change rate is limited to a value less than rated power per predetermined reference duration, and/or the change rate is limited to a value less than 1% of rated power per second, in particular less than 0.2% of rated power per second.

According to one aspect the maximum power value is calculated to raise and/or to take values above the predetermined power limit, if the calculated average power is below the predetermined power limit, and the maximum power value is calculated to fall and/or to take values below the predetermined power limit, if the calculated average power is above the predetermined power limit.

Therefore, if the average power is below the predetermined power limit value the maximum power value is calculate to raise the average power. That can be done by setting the maximum power value to a value above the predetermined power limit value. However, if the previously calculated maximum power value is currently below the predetermined power limit value, the maximum power value is just calculated to rise, in order to increase the power, but it may not be pulled in one step to a value above the predetermined power limit value to ensure an almost steady curve. But if the previously calculated maximum power value is only slightly above the predetermined power limit value and/or the average power is significantly below the predetermined power limit value, the maximum power value may be calculated to rise and to take values above the predetermined power limit at the same time.

If the average power is above the predetermined power limit value, the maximum power value is calculate to lower the average power. For lowering the average power the method works similar as described above for raising the average power, but with changed signs/changed directions. However, the control should avoid that the average power appears above the predetermined power limit value.

According to one aspect the maximum power value is used to amend the main power or torque set value and/or the maximum power value is used to limit an overall power or torque set value defined as the sum of the main power or torque set value and the additional power or torque set value. The underlying idea is that the maximum power value may be used not only to lower the power value and thus to limit the power value, but also to raise the power value as well as. For raising the power value, i.e., the output power value, the main power or torque set value can be amended accordingly, i.e., it can be raised.

To lower the output power the main power or torque set value may also be lowered, but the additional power or torque set value may lead to exceed the power limit value. Accordingly for making sure that the maximum power value is not exceeded a limit is provided in order to limit the sum of the main and the additional set value. Both effects can be combined such that the main power or torque set value is amended according to the maximum power value and in addition the overall power or torque set value is also limited. This way the output power can be controlled in both directions.

If the control strategy uses the power and accordingly the main control provides a power set value and the additional control provides an additional power set value, these can directly be amended based on the maximum power value.

If the main control provides a torque set value and the additional control provides an additional torque set value, the maximum power value can be transformed into a maximum torque value just by dividing the maximum power value by a rotor speed set value or by a rated rotor speed value.

The maximum power value may also be used to amend the additional power or torque set value. Possibilities how to put this into practice have already been explained above. However, this way the additional controller may also consider such maximum power value and may adapt the additional power or torque set value accordingly.

According to one aspect the additional power or torque set value and/or the maximum power value is calculated such, that a load reduction is achieved without reducing an annual energy production and/or such that an annual energy production is increased while not increasing the load. Accordingly, two strategies are suggested for tuning the additional control and/or the maximum power control. According to one reducing loads of the wind turbine is the aim. In particular setting the explained gain factor to 100% is a suggestion for such defensive strategy.

The other strategy is to focus on increasing the power production. Using the additional control reduces loads. However, it also leads to an average rotor speed which is higher than controlling the wind turbine without the additional control. The reason is that the control faces a nonlinear system. Such system can in part even be understood as being an instable system, in a sense of control theory rather than in sense of collapsing.

When operating the wind turbine in a rated operation, the wind turbine is producing less power than would be available according to the prevailing wind conditions. The wind turbine is thus operated in a reduced mode and thus in a non-optimal mode. In particular the rotor speed is below optimal speed in an aerodynamic sense. In case of a positive wind gust, the rotor accelerates and thus the rotor speed is increased towards an aerodynamically optimal operating point. Thus the wind turbine tends to increase its rotor speed. In case of a negative wind gust the same principle applies, i.e., that the aerodynamically optimal operating point would be at higher rotor speeds. Accordingly in both cases the nonlinear system in combination with the additional control results in an increased average rotor speed. Accordingly there is generally more energy in the rotor and it is suggested feeding this energy and thereby increasing the annual energy production while not increasing the load.

In addition, the maximum power control increases the average power. Without such maximum power control the output power in case of fluctuations in the wind, which always occur, tends to be significantly below a power limit value whereas the maximum power control increases the average output power towards the power limit value.

However, as the suggested control concept, in particular the additional control reduces loads, is possible to increase the power production and thus the annual energy production while still not increasing the load.

Both strategies can be combined by adjusting the control such, that neither the load reduction capability nor the increase of annual energy production capability is fully exhausted. Accordingly a compromise can also be chosen when adjusting the control strategy. Such compromise, i.e., going for both strategies, is particularly preferred as this way a safety margin can be achieved. This way neither the annual energy production is controlled to be at its lower limit, i.e., at its former value which shall be increased, nor the load of the wind turbine is at its upper limit, i.e., at a limit which shall not be exceeded.

Both the additional control and the maximum power control can be adjusted in a manner to reduce loads and/or increase average power production. This can be understood without direct comparison to a system which is not optimized in this manner, as the effects are clear without such comparison. However said decrease in loads or increase in average power production (increase in annual energy production) may also be understood when compared with the same control but without the additional control and/or without the maximum power control respectively. The additional control as well as the maximum power control are both control parts for optimization but not necessary for ensuring the general operation of the wind turbine. Accordingly the wind turbine can be operated without these two mentioned controls and the decrease of loads and increase of power production is compared with such set up not having these two controls.

According to one aspect the reference duration is in the range of 5 to 30 minutes in particular it is approximately 10 minutes. It was found that a short increase of the power above a power limit value is acceptable and not damaging the wind turbine or reducing the live time of the wind turbine. Accordingly the maximum power control considers such short time periods and the range of 5 to 30 minutes is considered to be a short time period. In particular 10 minutes is a short time period but is also long enough to achieve significant effects with respect to increasing the average power level. It is also long enough to be able to introduce slopes for changing the maximum power value, i.e., such time period is long enough to achieve a gradual change in the maximum power value.

Also provided is a wind turbine. The wind turbine is adapted for controlling a rotor speed of a rotor of the wind turbine at rated or curtailed operation conditions, the rotor being an aerodynamic rotor having one or a plurality of rotor blades, and the wind turbine further having a tower and a generator wherein the wind turbine further comprises a pitch control for providing a pitch angle set value depending on an actual rotor speed for setting a pitch angle of the rotor blades. It also comprises a main control for providing a main power or torque set value for controlling the power or torque of the generator, and an additional control for providing an additional power or torque set value depending on the actual rotor speed, wherein the additional control is adapted such, that the additional power or torque set value is provided as an offset value and is added to the main power or torque set value respectively. The power or torque set value is calculated depending on a control deviation of the rotor speed, and optionally, in combination with the additional control, or instead of it, the wind turbine comprises a maximum power control for providing a maximum power value as a varying value for limiting an output power of the generator. The maximum power control is adapted such, that the maximum power value is calculated depending on a predetermined power limit value, and depending on a predetermined reference duration, in order to provide for the reference duration an average power reaching or at least not exceeding the predetermined power limit value.

Accordingly, there is a wind turbine suggested which is controlled by a method for controlling a rotor speed in the described manner. The wind turbine comprises a pitch control, the main control, the additional control and in addition or as an alternative to the additional control a maximum power control. All these controls may be implemented in a computer having a processor. Each control may be implemented in its own processor, or they may be integrated in one control (or processor or microprocessor), or at least some of them. They may be combined in a computer program for controlling the wind turbine and such computer program may be implemented in a computer and/or processor.

According to one aspect the wind turbine is adapted for controlling the rotor speed by means of a method according to at least one aspect as explained above.

Also provided is a wind farm having a plurality of wind turbines according to any of the above mentioned aspects of wind turbines. Such wind farm may have a point of common coupling used by all wind turbines in order to feed the produced power into the electrical supply grid. It was found that the proposed method and the proposed wind turbines may result in fluctuating output power due to wind gusts. However such wind gusts do not reach all wind turbines in a wind farm exactly at the same time and accordingly the power fluctuations also vary at least by a time from one wind turbine in the wind farm to another. Accordingly the wind farm is levelling out such fluctuations and accordingly power fluctuations due to the suggested control method are less relevant for the electrical supply grid if the method is used for a plurality of wind turbines within a wind farm.

BRIEF DESCRIPTION OF THE SEVERAL VIEWS OF THE DRAWINGS

Below the invention is explained by a way of examples using embodiments based on the attached figures.

DETAILED DESCRIPTION

Figure 1:
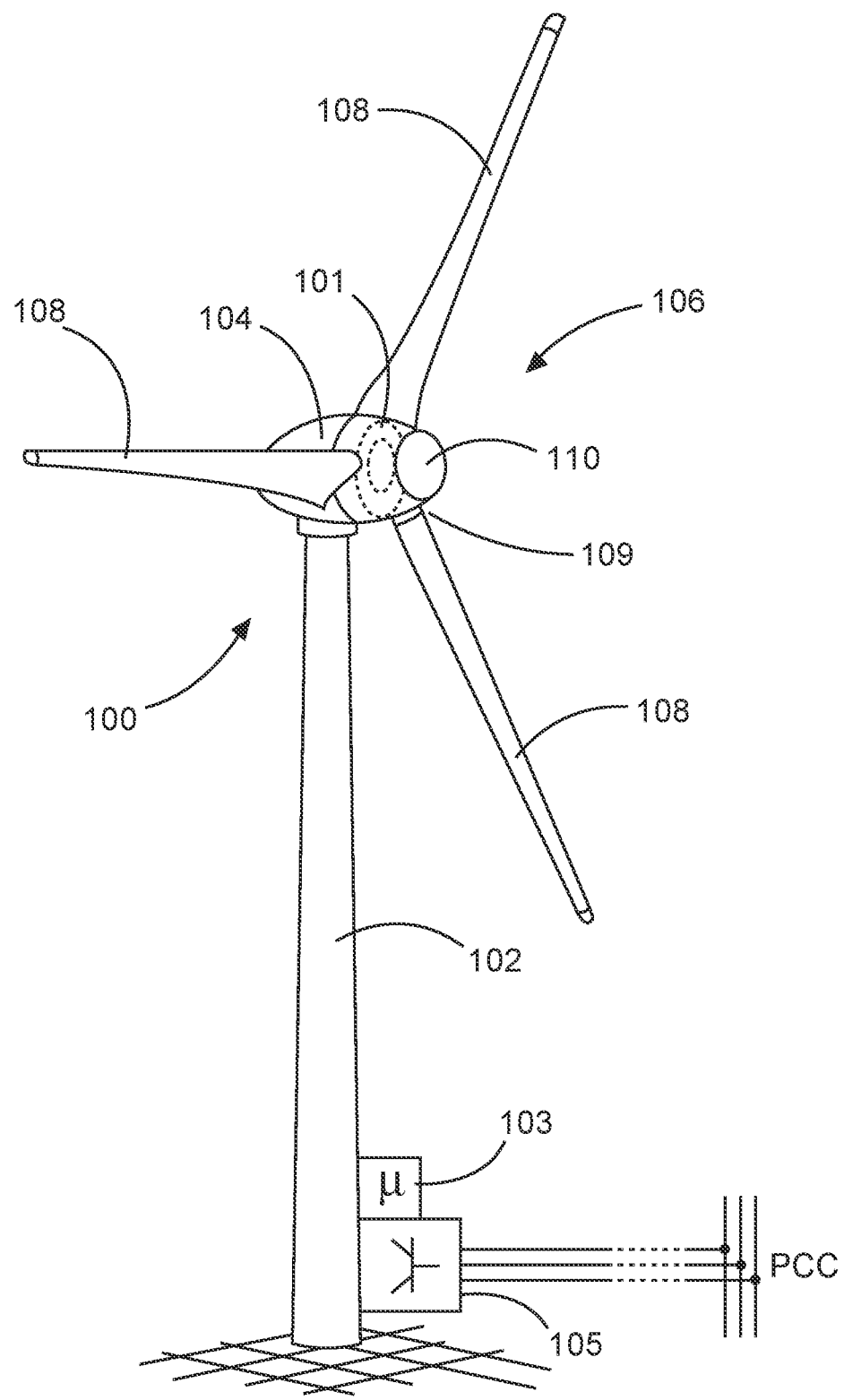
FIG. 1 shows a wind turbine in a perspective view.

FIG. 1 shows a schematic illustration of a wind power installation according to the invention. The wind power installation 100 comprises a tower 102 and a nacelle 104 on the tower 102. An aerodynamic rotor 106 comprising three rotor blades 108 and a spinner 110 is provided on the nacelle 104. The aerodynamic rotor 106 is caused to effect a rotational movement by the wind during operation of the wind power installation and thereby also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

The wind power installation 100 comprises an electrical generator 101, indicated in the nacelle 104. Electrical power can be generated by means of the generator 101. An infeed unit 105, which can be configured as an inverter, in particular, is provided for feeding in electrical power. It is thus possible to generate a three-phase infeed current and/or a three-phase infeed voltage according to amplitude, frequency and phase, for infeed at a network connection point PCC. That can be effected directly or else jointly with further wind power installations in a wind farm. An installation controller (including a processor or microprocessor) 103 is provided for controlling the wind power installation 100 and also the infeed unit 105. The installation controller 103 can also acquire predefined values from an external source, in particular from a central farm computer.

Figure 2:
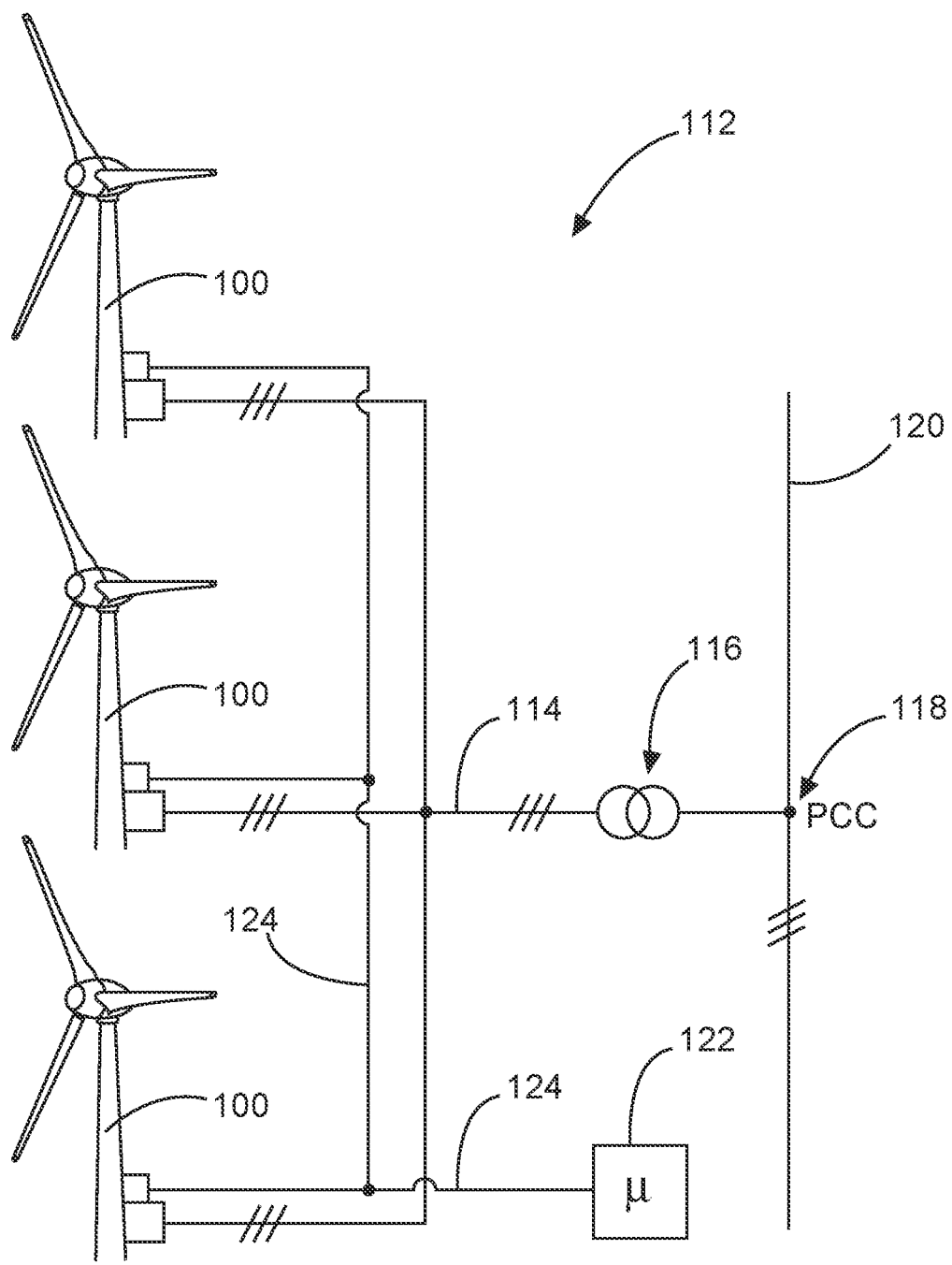
FIG. 2 shows a wind farm in a schematically view.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a wind farm 112. Moreover, by way of example, the farm network 114 can be configured differently, with for example a transformer also being present at the output of each wind power installation 100, to mention just one different exemplary embodiment.

The wind farm 112 additionally comprises a central farm computer (such as a processor or microprocessor) 122. The central farm computer can be connected to the wind power installations 100 via data lines 124, or in a wireless manner, in order thereby to exchange data with the wind power installations and in particular to acquire measured values from the wind power installations 100 and to transmit control values to the wind power installations 100.

Figure 3:
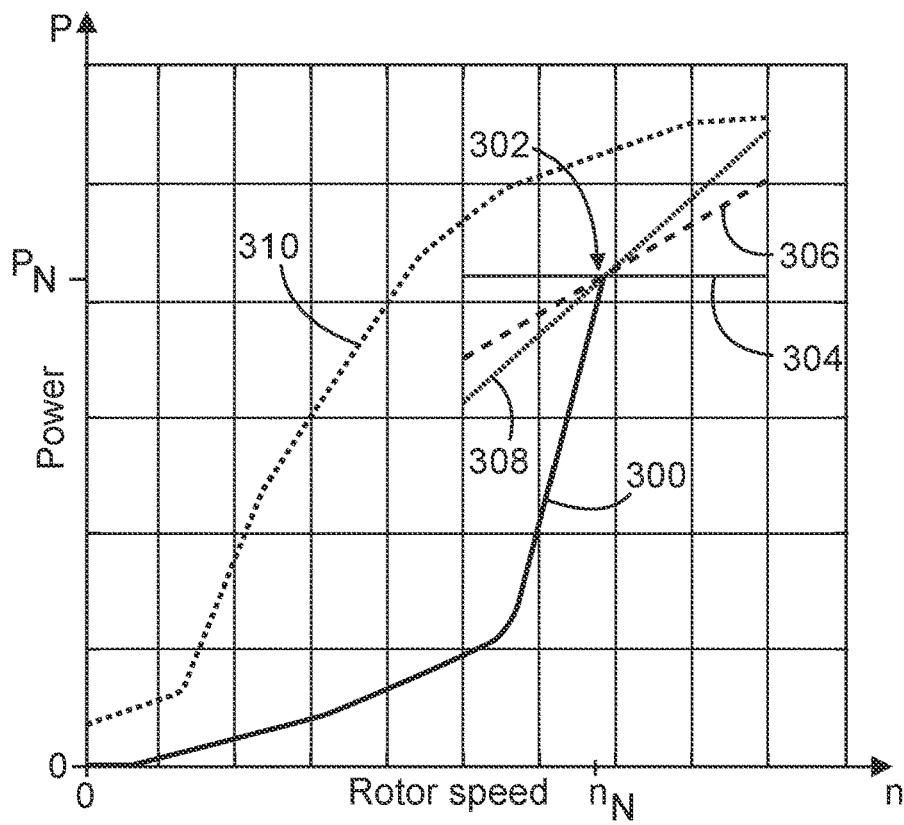
FIG. 3 shows a power to rotor speed curve explaining different aspects.

FIG. 3 shows a power to rotor speed curve 300. Said curve is basically shown for sub-rated conditions, i.e., below rated rotor speed $n_N$ and below rated power $P_N$. However the diagram also shows the optimal rated operating point 302. This optimal rated operating point is reached and used for rated wind speeds and wind speeds above. Accordingly at this rated operating point 302 the output power P is at the level of rated power and the rotor speed n is at rated rotor speed $n_N$. If the wind further rises this optimal rated operating point will not change. Instead the rotor blades will be pitched in order to extract less power from the wind than it could. This way the optimal rated operating point 302 can be maintained.

However in case of wind gusts quick changes of the wind speed occur and to simplify the explanations it is assumed, unless explained differently, that during such short deviations of the wind no pitching of the rotor blades will take place. Accordingly it is assumed for the following explanations that the pitch angle for all rotor blades is constant.

A typically used control concept is to keep the power constant during such wind gusts. This conventional control is represented by the constant power curve 304. In case of a positive wind gust the rotor speed n will increase and the wind turbine is controlled such that the power is kept constant. The same applies if there is a negative wind gust resulting in a drop of wind speed. In that case the rotor speed n will drop but the power is still kept constant by the control of the wind turbine. It is to be mentioned that even though the rotor speed falls during such negative wind gust to values below rated rotor speed $n_N$, the wind speed is still above nominal wind speed and accordingly the power will not drop. In other words even though the rotor speed falls below the rated rotor speed $n_N$ the operation is not necessarily changing back to a sub-rated operation.

Figure 4:
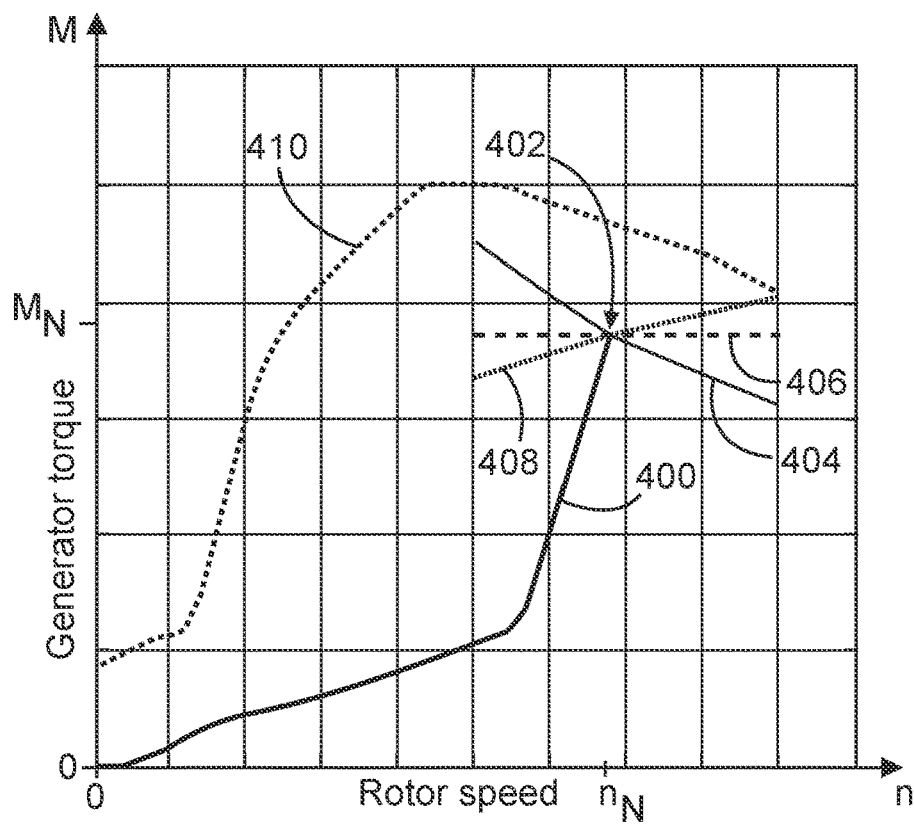
FIG. 4 shows a generator torque to rotor speed curve explaining different aspects.

However if the rotor speed increases and the power is kept constant as shown by the constant power curve 304, the generator torque will fall, as shown in FIG. 4 and as explained below. If the rotor speed drops below rated rotor speed $n_N$ while the power is kept constant, the corresponding generator torque will raise.

Such dropping or raising of the generator torque causes loads to the wind turbine and is to be reduced and accordingly a constant torque power curve 306 is suggested. Accordingly in case of a positive wind gust resulting in an increasing rotor speed n, the power is controlled to raise as well having the effect that the resulting generator torque is kept constant. The same constant torque power curve 306 is thus used for falling rotor speeds in particular due to negative wind gusts. Accordingly at falling rotor speed n the power shall also fall according to the constant torque power curve 306. This also results in keeping the generator torque constant. This result is also shown in FIG. 4 and will be explained below.

According to one embodiment it is even suggested to use an increasing torque power curve 308. As can been seen in FIG. 3 this increasing torque power curve is steeper when compared to the constant torque power curve 306. Accordingly with increasing rotor speed n the power is even further increasing for this increasing torque power curve 308 when compared to the constant torque power curve 306. This will result in even increasing generator torque power curve 308 with increasing rotor speed, as is explained in FIG. 4 below. Such increasing generator torque is in particular suggested in order to reduce longitudinal loads or oscillations as this avoids swinging forward of the tower after a positive wind gust has pushed the tower head backwards.

In addition in FIG. 3 there is also shown a power limitation curve 310 showing an instantaneous overall power limitation such as a power limit of the inverter for feeding electrical power.

FIG. 4 shows a torque to rotor speed curve 400 corresponding to the power to rotor speed curve 300 of FIG. 3. Accordingly the torque to rotor speed curve 400 is also basically shown for sub-rated operation conditions as long as this curve is below-rated rotor speed $n_N$ and below-rated generator torque $M_N$. However the description herein is concerned with the operation at rated operation conditions or alternatively curtailed operation conditions.

FIG. 4 also shows an optimal rated operating point 402 which corresponds to the optimal rated operating point 302 of FIG. 3. Here the wind speed is at or above rated wind speed and this optimal rated operating point 402 is basically controlled by means of pitching the rotor blades. However as explained with respect to FIG. 3 it is assumed that for the purpose of explaining aspects of the control the pitch angle of the rotor blades is constant.

FIG. 4 also shows a standard generator torque curve 404 which is related to the constant power curve 304 of FIG. 3. If the power is controlled to a constant value as shown and explained with respect to FIG. 3, the standard generator torque curve 404 is shown in FIG. 4. Accordingly with increasing rotor speed n the generator torque M decreases.

To improve that in order to reduce loads a controller according to the constant torque power curve 306 as explained and shown in FIG. 3 is suggested and the constant generator torque curve 406 results. Accordingly with increasing or decreasing rotor speed the generator torque according to the constant generator torque curve 306 remains constant. This lowers loads.

A more aggressive control aspect is to provide a control according to the increasing torque power curve 308 as shown and explained with respect to FIG. 3. The corresponding generator torque is shown by the increasing generator torque curve 408. Accordingly the power increase with increasing rotor speed is that strong, that the generator torque even increases with increasing rotor speed n. As explained above this may have advantages with respect to a longitudinal oscillation or longitudinal load.

In addition there is also shown a torque limitation curve 410 which also corresponds to the power limitation curve 310 according to FIG. 3.

Figure 5:
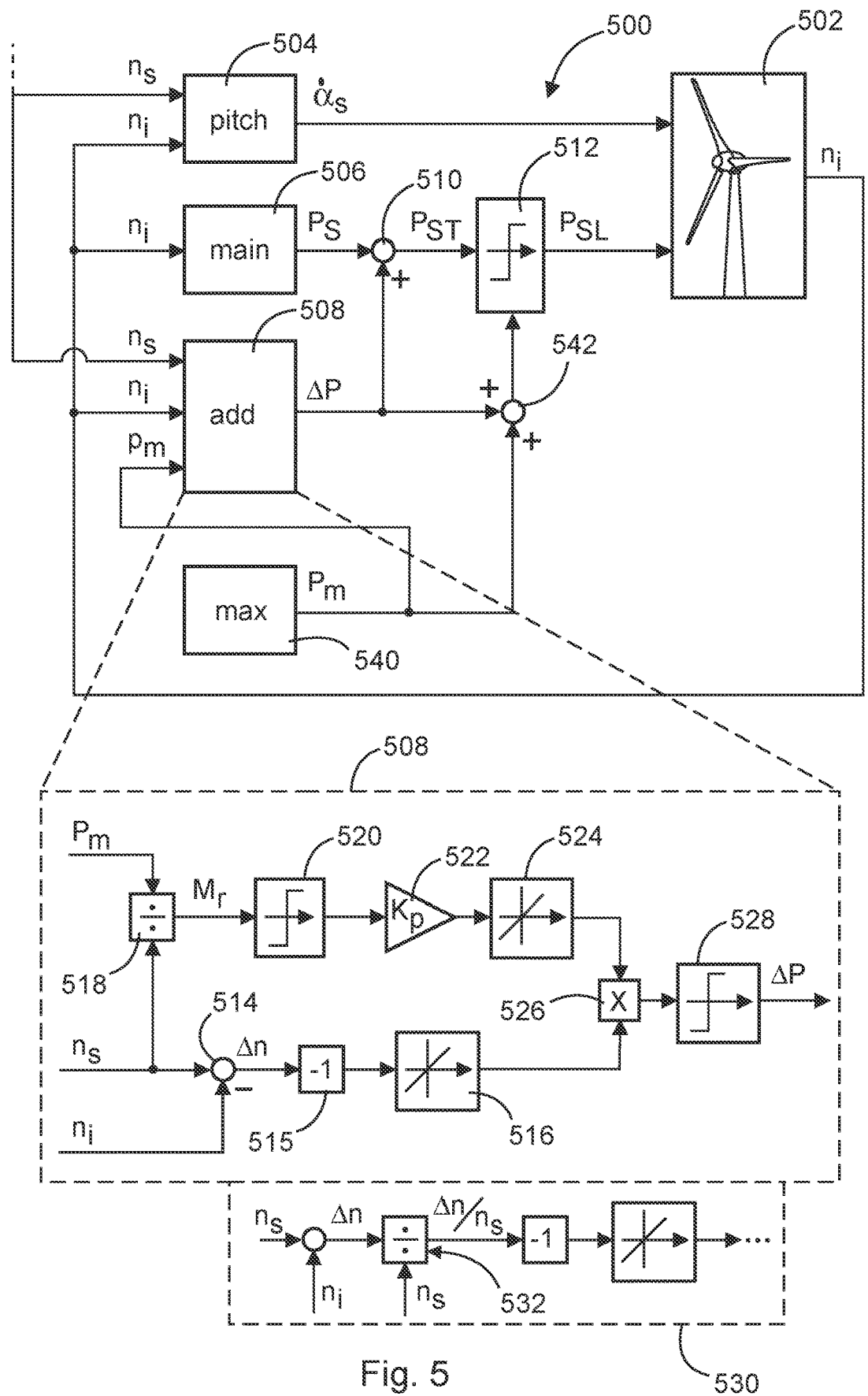
FIG. 5 shows a control structure.

FIG. 5 shows a control structure 500 for controlling the wind turbine 502. The control structure 500 may of course be part of the wind turbine 502 as it may be implemented in a controller of a wind turbine 502. However the turbine 502 is thus basically representing the physical part and behavior of the wind turbine. The output of the wind turbine is the actual rotor speed $n_i$ which may be a measured rotor speed or otherwise determined. Based on this actual rotor speed $n_i$ and a rotor speed set value $n_s$ a pitch control 504 provides a control signal for pitching the rotor blades. This control signal is provided as a derivative of a pitch angle set value $\dot{\alpha}_s$ i.e., it provides a pitch rate. This pitch control 504 is basically provided for controlling the wind turbine and thus the rotor speed in an optimal rated operation point, such as the optimal operating points 302 or 402 according to FIGS. 3 and 4. The rotor speed may be depicted by "n" or "ω". It only differs in the used physical unity (typically 1/s or rad/s).

In addition and in particular for quick responses there is also a main control 506 providing a main power set value $P_s$. According to a different embodiment the main control 506 may provide a main torque set value instead.

Such main control 506 may be a conventional main control. The main control 506 has the actual rotor speed $n_i$ as an input value, but the main control 506 may as well provide a constant value for the main power or torque set value, at least for high rotor speeds.

However, the main control 506 used in this embodiment uses a look-up table for setting the main power set value $P_s$. For rotor speeds at or above rated speed, in particular at or above a lower rotor speed limit value being below rated rotor speed, in particular being 0.5 to 1 rpm below rated rotor speed, the main power set value $P_s$ is set to high values above rated power. Accordingly the first limiter 512, that will further be explained below, may limit and thus reduce that value or a value based on that value. This way, the first limiter takes over the control for such high values of the main power set value $P_s$.

There is also an additional control 508 that provides an additional power set value or an additional torque set value depending on which kind of control principle is applied, i.e., depending on whether the main control provides a main power set value as shown in FIG. 5 or a main torque set value according to a different embodiment not shown in FIG. 5. However any explanations given for the embodiment shown in FIG. 5 shall also apply for this second possible strategy using a main torque set value and using an additional torque set value.

The shown additional control 508 thus provides an additional power set value ΔP and this is added in the first summing point 510 to the main power set value $P_s$. The result is the total power set value $P_{sT}$. This value is limited by a first limiter 512 and the result is the limited power set value $P_{sL}$. The first limiter 512 may be a safety element and most of the time the total power set value $P_{sT}$ may not reach the limit and in that case it is identical to the limited power set value $P_{sL}$. Accordingly this limited power set value $P_{sL}$ is given as a corresponding power set value to the wind turbine 502 and accordingly the wind turbine is operated such that it provides an output power according to this inputted power set value.

However, if the main control 506 provides high main power set values $P_s$ the limited power set value $P_{sL}$ is also high and the first limiter 512 becomes more relevant. In order to avoid in that case that the additional power set value ΔP is cut off by the first limiter and thus deactivated, this additional power set value ΔP is also influencing the limit of the first limiter 512 via the $3^{rd}$ summing point 542, also further explained below. Accordingly, while raising the total power set value $P_{sT}$ by the additional power set value ΔP, the limit of the first limiter 512 is synchronously raised and that way the additional power set value ΔP has full effect on the limited power set value $P_{sL}$.

That may result in even higher values of the limited power set value $P_{sL}$, i.e., above the maximum power value. However such too high values are acceptable as they appear not to be too big and there may also be a further limiter, in particular a limiter provided by an inverter for feeding the power into a supply grid.

Details of the additional control 508 are shown in the enlarged view at the bottom of FIG. 5. Input values for this additional control are the actual rotor speed $n_i$, the rotor speed set value $n_s$ and a maximum power value $P_m$. Using the second summing point 514 a rotor speed deviation Δn is calculated which is thus a control deviation of the rotor speed. Both terms are used synonymously. For this rotor speed deviation Δn a sign changer 515 achieves a reversal of the sign for this rotor speed deviation Δn which may further be limited by a first rate limiter 516 in order to avoid too quick changes of this rotor speed deviation. The reversal of the sign could also be implemented in other elements such as in the rate limiter 516. Instead, the inputs of the second summing point 514 could be changed.

In addition a reference torque $M_r$ is calculated by dividing the maximum power value $P_m$ by the rotor set value $n_s$ using a dividing element 518. This reference torque $M_r$ may also be limited by a second limiter 520. For adjusting or tuning the additional control 508 a gain factor 522 is provided. The reference torque, limited and multiplied by the gain factor may also be limited by a second-rate limiter 524 to avoid too quick changes of this value. The result is multiplied with the rate limited rotor speed deviation using the multiplying element 526. The result may also be limited by a third limiter 528. The result is the additional power set value ΔP.

If the additional control 508 shall according to the second embodiment provide an additional torque set value, the rotor speed deviation ΔM may be transformed into a relative rotor speed deviation Δn/$n_s$. The remaining structure of the additional control 508 may remain unchanged. A possible amended part of the structure is indicated in the block 530 for this second embodiment. Accordingly a second dividing element 532 is placed between the second summing point 514 and the sign changer 515, or the first-rate limiter 516.

However going back to the first embodiment the additional control 508 works as follows. For simplifying the explanations the $2^{nd}$ limiter 520 and the $2^{nd}$ rate limiter 524 shown in the addition control 508 may be neglected. Accordingly if a wind gust occurs a rotor speed deviation Δn will result at the second summing point 514.

Neglecting dynamical behavior of the maximum power $P_m$ and the rotor speed set value $n_s$ the reference torque $M_r$ corresponds to the generator torque if the generator produces the maximum power $P_m$ and rotates at the rotor speed set value $n_s$. Multiplying such reference torque $M_r$ with the rotor speed deviation Δn thus results in a power value which is exactly the additional power the generator would generate when operating with the reference torque but with a higher rotor speed according to the rotor speed deviation Δn. Accordingly this additional power set value ΔP is outputted by the additional control 508 and added to the main power set value $P_s$ at the first summing point 510. Accordingly the output power of the wind turbine will rise with increasing rotor speed such that the generator torque is kept constant.

These explanations given above assume a gain factor 522 to be 1 or 100%. Accordingly if this gain factor 520 is set to a higher value than 100% the overall power, i.e., the power produced by the wind turbine will rise even further resulting in the generator torque also rising even though not as strong as the power. If the gain factor 522 on the other hand is set to a value below 1, i.e., to a value between 0 and 1, the power is not rising that strong with increasing rotor speed so that the generator torque is not constant but also dropping. However it is dropping with a smaller amount when compared to not adding any additional power.

The control structure 500 also shows a maximum power control 540. Such maximum power control may provide a varying maximum power value as will be described below with respect to FIG. 6. However this maximum power value $P_m$ provides an input to the additional control 508 as explained. In addition the maximum power value may be added to the additional power set value at the third summing point 542. The result is used to change the limit of the first limiter 512. This way the limited power set value $P_{sL}$ may vary in order to get the most possible annual energy production without violating any power limits.

At least for rotor speeds at or above rated rotor speed, or at or above the lower rotor speed limit explained above, the main power set value $P_s$ and also the total power set value $P_{sT}$ will most of the time be above the limit of the first limiter 512. Accordingly raising or lowering the limit will result in raising or lowering the limited power set value $P_{sL}$. To ensure that the limited power set value $P_{sL}$ also depends on the additional power set value $\Delta P$, this additional power set value $\Delta P$ is added at the $3^{rd}$ summing point to the maximum power value $P_m$ and the result is used for setting or adjusting the limit value of the first limiter 512 and thus changing the limited power set value $P_{sL}$ accordingly.

Providing such corrected maximum power value is done by the maximum power control 540 as will be explained below with respect to FIG. 6.

Figure 6:
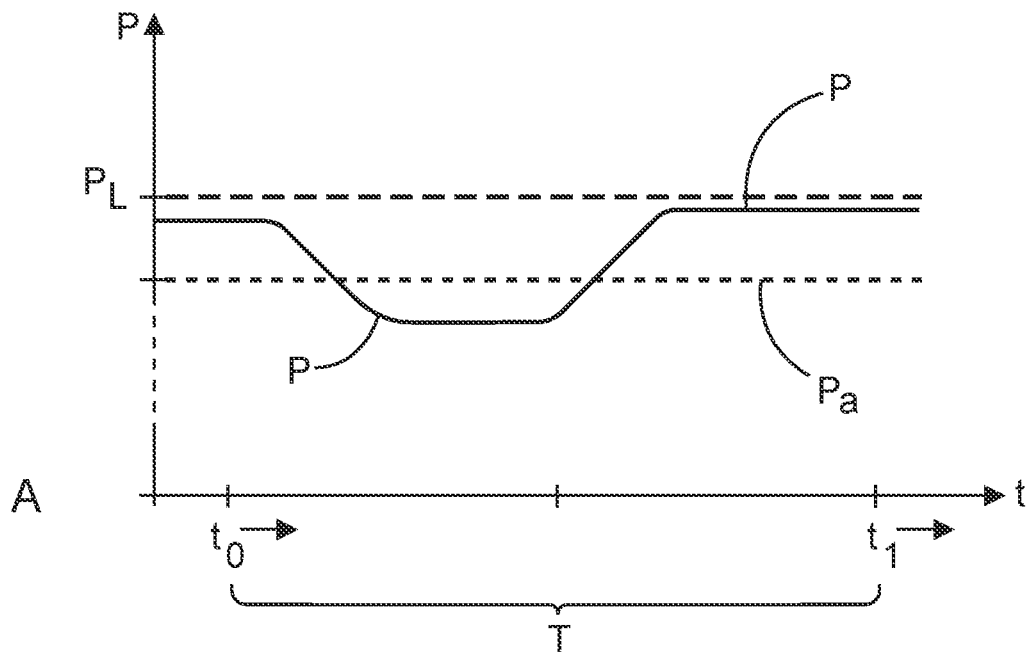
FIG. 6 shows two diagrams explaining the operation of a maximum power control.
Figure 6:
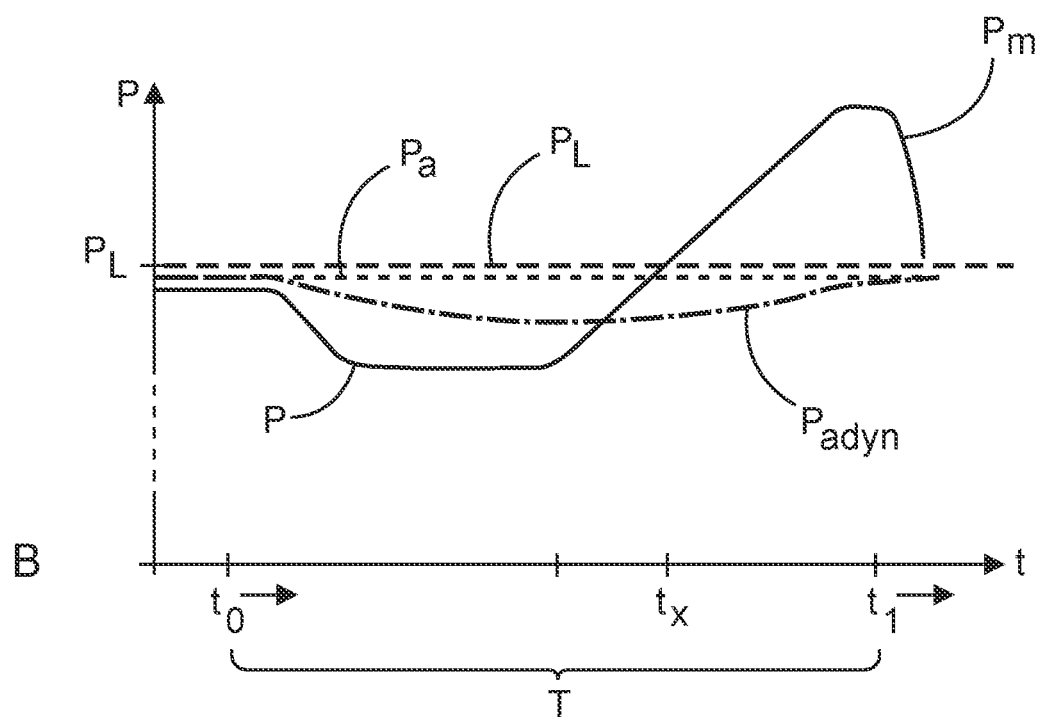

FIG. 6 shows two diagrams, both showing a time series of a power value P for a time period from $t_0$ to $t_1$ having a length of a reference duration T. The time $t_1$ shows the actual time or current time. The time period from $t_0$ to $t_1$ also changes from one current time to the next current time and that is indicated by the arrows at $t_0$ and $t_1$ in both diagrams. Both diagrams also show a power limit value $P_L$ as a dashed line which shall not be exceeded by an average power $P_a$ which is shown by a dotted line.

The upper diagram A shows a situation which shall be improved and accordingly diagram B shows the improved situation and it shows the result of the operation implemented in the maximum power control 540 shown in FIG. 5.

According to diagram A the time series of the power value P is always below the power limit value $P_L$. When for any reason the power value P drops, the control tries to raise the power value P again, but only up to the power limit value $P_L$. Accordingly, the average power $P_a$ is not reaching the power limit value $P_L$ but is staying below it with a certain distance.

According to diagram B the time series of the power value P is not always below the power limit value $P_L$. When for any reason the power value P drops, the control also tries to raise the power value P again. Therefor the left sides of both diagrams are similar. However, in diagram B, the power value is not only raised up to the power limit value $P_L$ but also above it.

This is done by increasing the power value P even above the power limit value $P_L$ when the average power $P_a$ is below the power limit value. The result is shown in diagram B and accordingly the power value P was raised above the power limit value $P_L$ but was also reduced again to avoid that the average power $P_a$ would also rise above the power limit value $P_L$.

FIG. 6 shows for the average power $P_a$ only a snap-shot at time $t_1$ illustrating the average power value $P_a$ as a constant value. However the average power $P_a$ is also be a dynamically changing value. That is illustrated by the chain line $P_{adyn}$ in diagram B.

As long as $P_{adyn}$ according to the chain line is below the power limit value $P_L$ the maximum power control calculates a maximum power $P_m$ that may be above the power limit value $P_L$. However to provide a continuous curve the maximum power $P_m$ will not immediately be raised above the maximum power $P_m$. In the diagram B that firstly happened at $t_x$. But at $t_1$ (the current time) $P_{adyn}$ according to the chain line reaches the power limit value $P_L$ and thus the maximum power value $P_m$ is lowered back to the power limit value $P_L$ and may be lowered further. Of course such lowering of the maximum power value $P_m$ may start before the average power reaches the power limit value $P_L$.

In diagram B the right part of the power value is also depicted as in theory the maximum power value $P_m$ should be identical to the actual power value P. However, the curve shown on the left side of the diagram shows a drop in the power value which was not controlled by the maximum power value but might be a result of a negative wind gust.

The embodiments described herein are thus based on realizing that a known control rule aiming to basically keep the output power constant during rated operation at least partially leads to a significant drop in the generator torque. As a result the rotor additionally accelerates and initiates lateral oscillations. Such initiation and thus additional loads during operation shall be avoided or at least reduced.

The present disclosure may be part or an additional feature of the control software of the wind turbine, in particular that part for determining of actual power set values by the operational control. On the one hand the disclosure may reduce oscillations of the tower and thus reduce of loads during operation, and on the other hand it shall support the pitch-rotor speed-control.

In conventional operating control during rated operation a constant power is controlled, as was explained with respect to FIG. 3. It is to be noted that in over speed situation as well as in under speed situations, as far as possible, a constant power (usually the rated power) is controlled. In particular at under speed situations the power is kept constant due to assuming that a negative wind gust will last only for a short time. Due to $P=M*\omega$ the control of a constant power leads to a reduction of the generator torque with increasing rotor speed or it leads to an increase of the generator torque with dropping rotor speed as shown in FIG. 4. The generator torque acts in both cases in favor of the acceleration of the rotor or deceleration of the rotor caused by the wind. It is known that the acceleration or deceleration of the rotor respectively lead to stimulating of a lateral tower oscillation. Accordingly influencing the change speed of the torque can result in a reduction of tower loads. As an additional note since the rotor speed is driven aerodynamically the desire is to control the fast generator torque.

The rate of change is influenced by adding an offset to the actual power set value resulting in a levelling or even increasing of the generator torque. This power offset is determined using the mentioned relationship between power, torque and rotor speed. In FIGS. 3 and 4 there are in addition to the common power to rotor speed curve or torque to rotor speed curve the power or torque targets shown (dashed line) which result after applying the additional control and thus after applying the additional power set value (the power offset). In order to illustrate the different possibilities the version of the constant torque as well as the increased torque at over speed values were shown. In these illustrations there are in addition limits depending on the rotor speed shown which for example may be restrictions given by the power electronics. When applying such corresponding power set value these limits must be met.

FIG. 5 shows a block diagram for illustrating the dependencies and the ways for calculating. The calculation of the output value happen by means of the following steps:

(1) Determining a reference torque for the actual operating condition with considering the actual rotor speed set value and the corresponding maximum power.

(2) Determining the actual control deviation of the rotor speed based on the actual rotor speed and the rotor speed set value. As the rotor speed set value may change stepwise, the change rate in time of the control deviation of the rotor speed is limited in time, thereby avoiding power steps.

(3) Determining a variable gain factor based on which in combination with the control deviation of the rotor speed the offset for the power set value is calculated as followed:
  (a) The variable gain factor is a product of the determined reference torque and a gain factor which is typically in the range of 100% to 150%.
  (b) The gain factor, in particular a static gain factor enables the parameterization which may besides the possibility of keeping the torque constant, also be used to deliberately raise the torque value for further load reduction and for supporting the pitch-rotor speed control.
  (c) As the reference values, rotor speed set value or maximum power value, by which the reference torque is defined may changes in a stepwise manner, the timely change rate of the variable gain factor is finally limited, in order to avoid stepwise changes in the power.
(4) The offset of the power set value is a result of the product of the variable gain factor and of the control deviation of the rotor speed determined at step (2).
(5) Finally the offset of the power set value is limited in positive as well as in negative direction in order to, e.g., consider limits of the hardware.
(6) The suggested function is effectively finalized when this offset of the power set value is added to the actual power set value. Accordingly this describes the additional power set value to the main power set value.

During calculations, it was realized that with applying the above described method an increase of the average power results and accordingly there is effectively an increase of the annual energy production. Causes for the increase of the average power are:

Nonlinearity of the Product of the Torque and the Rotor Speed

The rotor speed control works against an instable control path, which at over speed accelerates quicker than it decelerates Stronger drops in wind power and thus under speed values of the rotor speed will already be reduced according to the power control and operational management due to reducing the generator torque. This already takes place without the suggested additional control.

The this way resulting additional power would in general lead to an increased tower load. The tower load reduction received by levelling the generator torque counteracts this, so that these effects together result in an increase of the annual energy production by keeping the loads approximately constant.

If the average increase of the power is for certain reasons not possible, e.g., due to limits of the electrical supply grid, there is a coupling of the above described method using the additional power or torque control with a temporary power boost (TPB) algorithm possible. The temporary power boost (TPB) algorithm corresponds to the described maximum power control. This way the TPB algorithm takes over the object to supervise the average power and in case of exceeding a limit value to reduce the power set value gradually or in case of falling below the limit value to gradually increase the power set value. This way a reference for the additional power or torque control is also gradually reduced or gradually increase respectively. According to FIG. 5 such relationship is indicated by corresponding arrows (cf. $P_m$, $P_{sL}$). In the meantime the generator torque is further as far as possible kept constant or purposely increased (depending on the parametrization) which is done by the additional control providing an additional power or torque set value. This combination thus leads to a reduction of loads by keeping the annual energy production basically constant. Keeping the annual energy production basically constant could be seen as the main result of the TPB algorithm, whereas the load reduction is mainly a result of the additional control.

Accordingly depending on the coupling of the additional control with or without said temporary power boost two different possibilities of use are suggested:
  (1) A load reduction by maintaining the annual energy production (this is in particular achieved with coupling with the temporary power boost algorithm).
  (2) An increase of the annual energy production with keeping the load basically constant (basically without coupling of the temporary power boost algorithm).

The disclosure is suggested to be implemented on a control of the wind turbine in real-time. In general the application is possible for new wind turbines, as well as on existing wind turbines. The possibility of the application may also depend on reserves of the electrical components as well as given boundary conditions due to official provisions.

In addition the disclosure may also lead to reducing loads of pitch components due to reduce travelling distances.

Accordingly as described above a solution was provided that avoids quick changes of the generator torque leading to a load reduction by keeping the annual energy production on its level, or an increase of the annual energy production by keeping loads on its level. In addition loads on pitch components are reduced by increasing the generator torque, and the rotor speed control of the pitch system is facilitated.

The disclosure is basically in addition to so far existing control concepts or control software of wind turbines. FIG. 5 shows how this additional control is integrated in an existing structure. This is shown in FIG. 5 as a block diagram. Accordingly the embodiments can be understood by a kind of additional module for power control, not needing a new development. Of course such power control is used for controlling the rotor speed. The input values for the suggested additional control are the actual rotor speed set value as well as a maximum power value, which must be met. The additional output power which may be positive as well as negative is added to the main power set value, at least according to one strategy.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a rotor speed of a rotor of a wind turbine at rated or curtailed operation conditions the rotor being an aerodynamic rotor having one or a plurality of rotor blades, the wind turbine comprising a tower and a generator, the method comprising:
  using a pitch control to provide a pitch angle set value, the pitch angle set value being dependent on an actual rotor speed for setting a pitch angle of the rotor blades,
  using a main control to provide a main power or torque set value for controlling the power or torque of the generator, and using an additional control to provide an additional power or torque set value, the additional power or torque set value being dependent on the actual rotor speed, wherein the additional power or torque set value is provided as an offset value and is added to the main power or torque set value, and wherein:
the additional power or torque set value is calculated depending on a control deviation of the rotor speed, and/or a maximum power control provides a maximum power value as a varying value for limiting an output power of the generator, and the maximum power value is calculated depending on:
a predetermined power limit value, and
a predetermined reference duration,
to provide for the reference duration an average power reaching or at least not exceeding the predetermined power limit value.

2. The method according to claim 1, comprising:
calculating the additional power or torque set value depending on the control deviation of the rotor speed using a nonlinear and/or a time variant control algorithm, and/or
wherein the main control provides the main power or torque set value depending on the rotor speed.

3. The method according to claim 1, comprising:
calculating the additional power or torque set value to counteract generator torque fluctuations caused by fluctuations of the rotor speed due to fluctuations in the wind speed,
wherein the main control is designed to keep the output power constant or reduce fluctuations of the power in case of fluctuating rotor speed, resulting in control related fluctuations of a generator torque, and
wherein the additional power or torque set value is calculated to counteract such control related fluctuations of the generator torque.

4. The method according to claim 1, wherein the additional power or torque set value is calculated such that:
a longitudinal tower load in a direction of an axis of rotation of the generator is reduced by applying the additional power or torque set value, and
a lateral tower load perpendicular to the axis of rotation of the generator is reduced by applying the additional power or torque set value.

5. The method according to claim 1, comprising calculating the additional power or torque set value in dependence on at least one of the maximum power value or a rotor speed set value for controlling a rotor speed.

6. The method according to claim 1, wherein the additional power or torque set value is calculated by multiplying:
a signal representative of the control deviation of the rotor speed, and
a variable gain signal,
wherein the variable gain signal is a signal representative of a scaled reference torque and/or calculated depending on:
the maximum power value, and
the rotor speed set value, and
a gain factor, and/or
a gain limiter, and/or
a gain change rate limiter.

7. The method according to claim 6, comprising:
calculating the variable gain signal by:

calculating a reference torque value by dividing the maximum power value by the rotor speed set value, and
multiplying the reference torque value with the gain factor.

8. The method according to claim 6, wherein:
the gain signal is limited by the gain limiter, and/or
a change rate of the gain signal is limited by a gain change rate limiter.

9. The method according to claim 6, comprising reducing loads on the tower of the wind turbine by:
setting the gain factor in a range of 10% to 200%, and/or
setting the gain factor in a range of 105% to 200%, and/or
setting the gain factor in a range of 110% to 150%, and/or
setting the gain factor to a value above 100% in order to increase a generator torque with increasing rotor speed, and/or
calculating the gain factor depending on an overload capability of the generator, describing a capability of the generator to exceed a rated power value and/or a rated generator torque.

10. The method according to claim 1, wherein the maximum power control operates such that in a repeating manner for each current time:
the average power is calculated for a time period having a length of the predetermined reference duration and ending at the current time, and
the maximum power value is calculated depending on the calculated average power and a previously calculated maximum power value.

11. The method according to claim 10, wherein:
the maximum power value is calculated to rise and/or to take values above the predetermined power limit, when the calculated average power is below the predetermined power limit, and
the maximum power value is calculated to fall and/or to take values below the predetermined power limit, when the calculated average power is above the predetermined power limit.

12. The method according to claim 1, wherein:
the maximum power value is used to amend the main power or torque set value, and/or
the maximum power value is used to limit an overall power or torque set value defined as a sum of the main power or torque set value and the additional power or toque set value, and/or
the maximum power value is used to amend the additional power or torque set value.

13. The method according to claim 1, wherein the additional power or torque set value, and/or the maximum power value is calculated such that:
a load reduction is achieved without reducing an annual energy production, and/or
an annual energy production is increased while not increasing the load when comparing one of the pitch control and the main control with the one of the pitch control and the main control but without the additional control and/or without the maximum power control, respectively.

14. The method according to claim 1, wherein the predetermined reference duration is in a range of 5 to 30 minutes.

15. A wind turbine comprising:
an aerodynamic rotor having one or more rotor blades, the wind turbine being adapted for adapted for controlling a rotor speed of an aerodynamic rotor at rated or curtailed operation conditions, a tower, a generator, a pitch control configured to provide a pitch angle set value, the pitch angle set value being dependent on an actual rotor speed for setting a pitch angle of the rotor blades, a main control configured to provide a main power or torque set value for controlling the power or torque of the generator, and an additional control configured to provide an additional power or torque set value, the additional power or torque set value being dependent on the actual rotor speed, wherein the additional control is adapted such that the additional power or torque set value is provided as an offset value and is added to the main power or torque set value respectively, wherein the additional power or torque set value is calculated depending on a control deviation of the rotor speed.

16. The wind turbine according to claim 15, comprising a maximum power control for providing a maximum power value as a varying value for limiting an output power of the generator and the maximum power control is adapted such that the maximum power value is calculated depending on:

a predetermined power limit value, and a predetermined reference duration, to provide for the predetermined reference duration an average power reaching or at least not exceeding the predetermined power limit value.

17. A windfarm comprising a plurality of wind turbines according to claim 15.

* * * * *